UNITED STATES PATENT OFFICE.

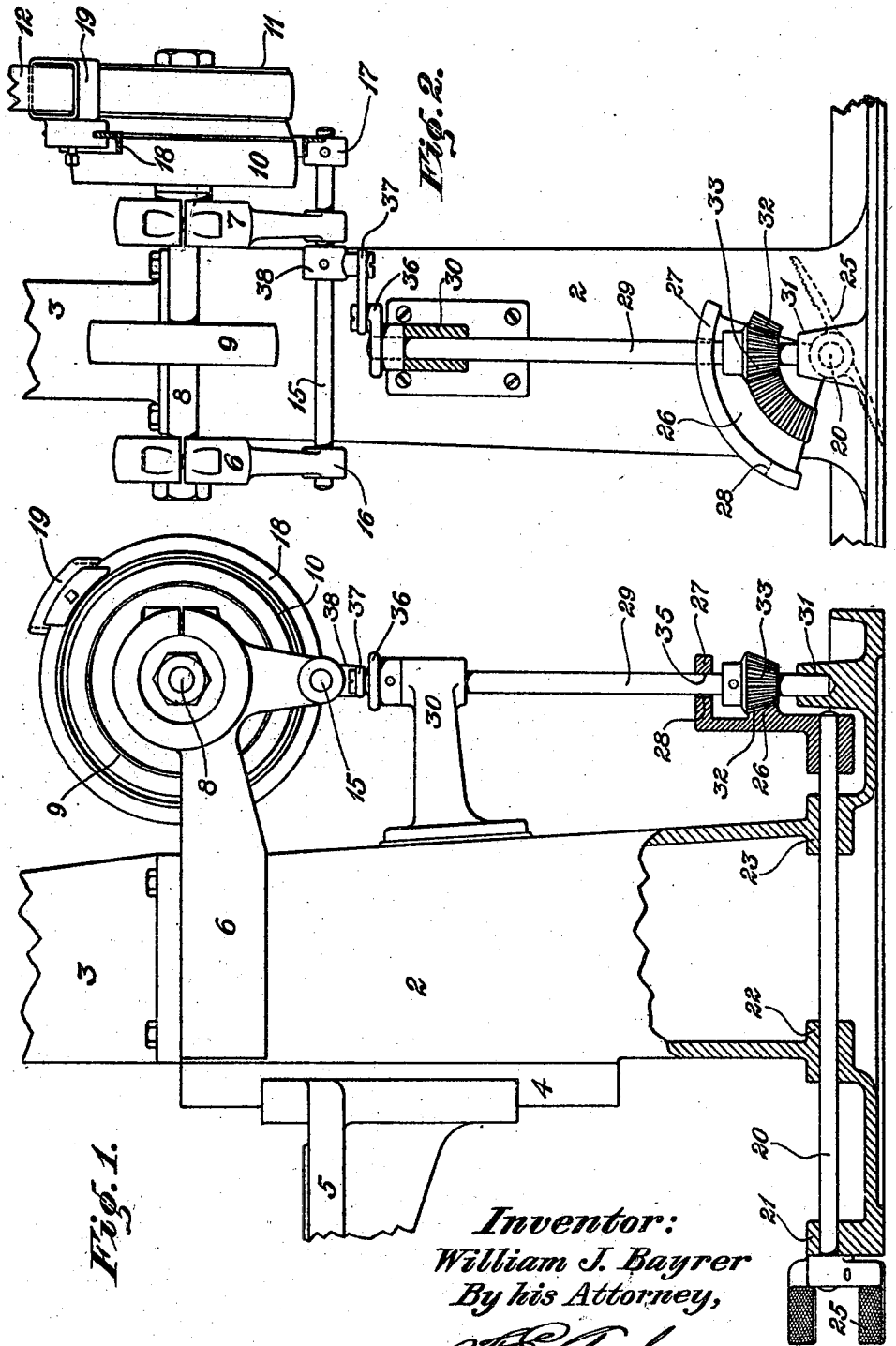

WILLIAM J. BAYRER, OF HARTFORD, CONNECTICUT; HOMER H. BAYRER, BEING ADMINISTRATOR OF SAID WILLIAM J. BAYRER, DECEASED, ASSIGNOR TO ROBERT G. HENRY, OF WEST HARTFORD, CONNECTICUT.

BELT-SHIFTING MECHANISM.

1,416,778.  Specification of Letters Patent.  Patented May 23, 1922.

Application filed September 18, 1919. Serial No. 324,632.

*To all whom it may concern:*

Be it known that I, WILLIAM J. BAYRER, a citizen of the United States, residing in the city of Hartford, county of Hartford, and State of Connecticut, have invented certain new and useful Improvements in Belt-Shifting Mechanism; and I do declare the following to be a full, clear, and exact description of the same, reference being had to the accompanying drawings, forming a part of this specification, and to the characters of reference marked thereon.

This invention relates to belt shifting mechanism and particularly to mechanism of this character suitable for application to the lower part of the frame of drilling machines of a well known type or to the frame of other machines of similar character wherein a shaft supported by the machine frame is provided with tight and loose pulleys adapted to be driven by a belt shiftable from one to the other of said pulleys.

One object of my invention, is the provision in a machine of the character mentioned, of belt shifting mechanism composed of few parts which may be inexpensively made and readily assembled. Other objects of the invention will hereinafter appear.

In the drawings accompanying this specification there is illustrated one convenient form of embodiment of my invention. Figure 1, is a side view partly in section of the lower part of a drilling machine provided with mechanism including my invention. Figure 2, is a rear view, also partly in section, of the structure shown in Fig. 1.

Like characters of reference designate like parts in each of the views.

Referring to the drawings, certain parts well identified with drilling machines may be briefly described as follows. The machine frame consists of the base 2, and pillar or column 3. At the front of the base, ways 4, are provided to receive the work support or table 5, which is movable along the ways by any suitable means, as a screw (not shown). Brackets 6 and 7, secured respectively to opposite sides of the base, support the shaft 8, which has a driving pulley 9, secured thereto and which also supports adjacent bearing 7, the tight and loose pulleys designated respectively by 10 and 11. A belt 12, is shiftable to either of these pulleys by means which will now be described and which more particularly involve my invention.

For directly engaging the belt a device is mounted on the shaft 15, which is supported in the bearings 16 and 17, depending respectively from brackets 6 and 7. This belt engaging device comprises a ring 18, secured near one end of shaft 15, and a yoke 19, adjustably secured to the ring. Peripheral adjustment of the yoke thus afforded, permits accommodation of the belt for any angle at which it may be directed for engagement with the pulleys. To shift the belt from one pulley to the other, the belt engaging yoke and its supporting ring are shifted, together with the shaft 15, which is longitudinally movable, through mechanism including shaft 20, which is supported in bearings 21, 22 and 23 of the machine frame. This shaft 20, is at its outer end toward the front of the machine, provided with a foot lever 25, and at its other end with the segment 26, the latter having an offset portion 27, slotted at 28, to engage a vertical rock shaft 29, which is supported in the bracket bearing 30, and the step bearing 31. Gear teeth 32, on the segment, mesh with a bevel gear 33, secured to the rock shaft, and a proper relation between these gear elements is maintained by engagement between the rock shaft and wall 35, of slot 28, this method being employed to eliminate the necessity of providing finished or machined ends on any of the bearings for shaft 20, to receive thrust of the gearing, the latter method being obviously much more costly as it would involve considerable handling of the large base casting. Secured to the upper end of the rock shaft is a crank or lever 36, connected by a link 37, with a collar 38, fast on shaft 15. The crank 36, through described parts, may be moved by the foot lever in either direction about a half revolution or a distance governed by the length of slot 28, and the motion thus imparted is just sufficient to move the belt yoke to shift the belt from one of the tight and loose pulleys to the other.

Having thus described my invention, what I claim is,—

1. In combination, a shaft, a segment on the shaft provided with a slot, a gear, and a shaft for the gear extending through the slot in the segment to effect a relative location of the segment and gear.

2. In combination, a rock shaft, a gear shaft, a gear on the gear shaft, and a gear segment on the rock shaft, the gear segment having a surface engageable with the gear shaft to effect a relative location of the segment and gear and opposed surfaces engageable with the gear shaft to limit movement of the rock shaft.

3. In combination, a rock shaft, a gear shaft, a gear on the gear shaft, and a gear segment secured to the rock shaft, the gear segment having surfaces adapted to engage the gear shaft in a manner to oppose longitudinal movement of the rock shaft and to limit oscillatory movement of the rock shaft.

WILLIAM J. BAYRER.